Dec. 3, 1935.  F. BUCK ET AL  2,022,756

TAPE MEASURE

Filed Sept. 30, 1933

INVENTORS
FRED BUCK
EUGENE J. WITCHGER

George B. Willcox
ATTORNEY

Patented Dec. 3, 1935

2,022,756

UNITED STATES PATENT OFFICE 2,022,756

TAPE MEASURE

Fred Buck and Eugene J. Witchger, Saginaw, Mich., assignors to The Lufkin Rule Company, Saginaw, Mich., a corporation of Michigan Application September 30, 1933, Serial No. 691,610

16 Claims. (Cl. 33—137)

A conventional tape measure to which this invention is applicable comprises a graduated tape, a tape case of circular form and means for extending the tape and stowing it in the case.

The main object of the present invention is to increase the usefulness of such tape measures by adapting them to measure accurately the distance between two abutments and yet retain the conventional shape and outward appearance of the ordinary tape measure. Other objects of the invention are to provide a tape measure of such character in which the structure shall be strong and mechanically efficient, simple to operate and compact in construction. These advantages we attain by a novel arrangement of the conventional tape measure and the additional devices hereinafter described in detail, the essential elements of our invention being more particularly pointed out in the appended claims defining it.

In the claims we have designated the essential elements of the invention, it being understood, however, that the claims are not intended to be limited to the form of the parts illustrated and described further than a limitation to the described form is necessary to distinguish them from the prior art.

Like reference characters indicate like parts in all the figures of the drawing.

Figure 1:
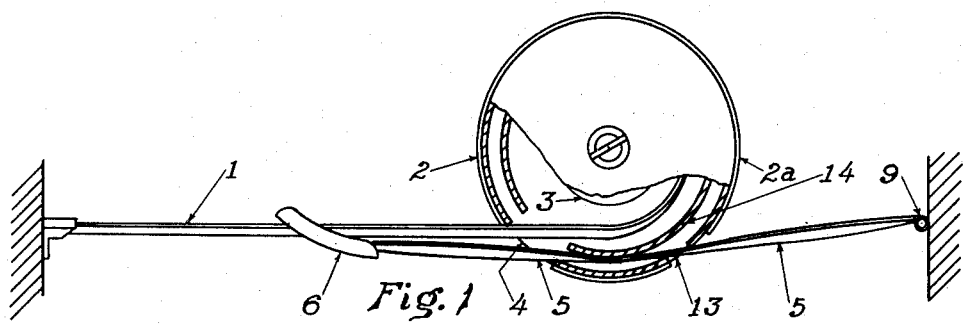
Fig. 1 is a part sectional side view of a tape measure embodying the invention as it appears when taking inside measurements, or measurements between two abutments.

The invention as embodied in the structure shown in the drawing consists of a tape measure comprising a tape 1, a case 2 and a drum 3 for coiling the tape. The tape 1 may be concavo-convex cross sectional shape, adapted to be coiled in the drum by shoving the tape into the case 2 through the tape opening 4, and to be unwound and extending for taking measurements by pulling it out by hand. It will be understood that our invention can be applied to other known types of tape measures, and this type has been chosen merely for purposes of description.

Numeral 5 designates a strip of material of any convenient predetermined length, say, five inches, and normally stiff and straight, or approximately so. Primarily this extension member 5 may be a flat strip of metal, but preferably it may be, as here shown, a strip of concavo-convex tape material that is stiff and straight in its free or normal condition yet is capable of being easily flexed to conform to the circular rim of the tape case when it is to be stowed, either inside the case in the manner to be described later, or else outside the case in an equivalent manner that will be apparent after this preferred form has been described.

Means is provided for keeping an end of strip 5 adjacent the tape 1 when the latter is extended. For that purpose a frame member 6 is fixed to the indicating end of extension strip 5, and the tape passes slidably through an opening 7 in the frame. The frame thus presents, by means of its edges 8, 8a, a measurement indicator for the graduated scale 10 on the face of the tape. The effective predetermined length of the strip 5 is the distance from edges 8, 8a at its indicating end to its rearwardly extending free end 9, and the graduated scale 10 on the tape is arranged to show at 8 a reading which is greater than the normal reading of the tape (at 8a) by the predetermined length of strip 5. Thus, in Fig. 2, the strip 5 is five inches long, and the reading of the tape scale at 8 is six and fifteen sixteenths inches, which is five inches more than the distance from the zero or free end of the tape 1 to indicator 8a. In other words, the graduated scale 10 which is used for taking inside measurements between abutments 11 and 12 starts at the zero end of the tape with the number that designates the effective length of strip 5, so that scale 10 actually begins with numeral "5".

Figures 3, 4, 6:
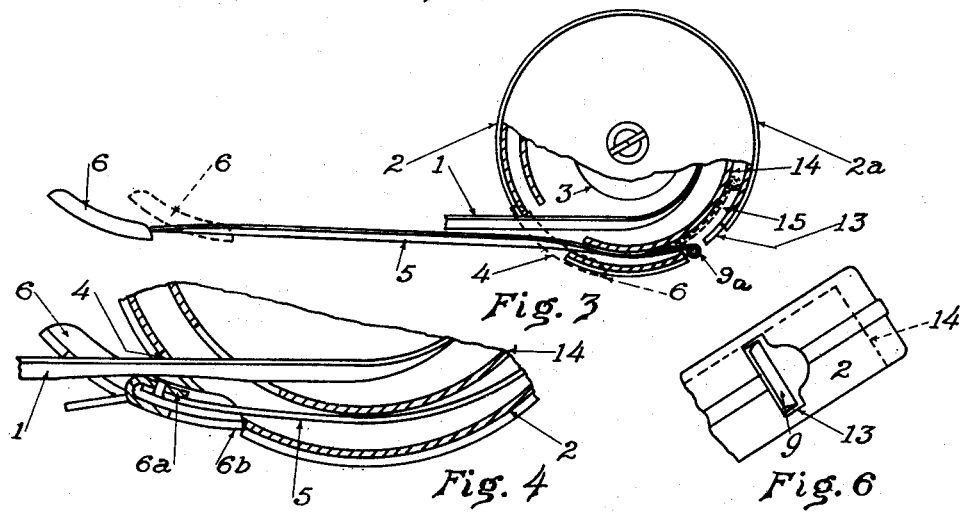
Fig. 3 shows the tape measure of Fig. 1 with the extension member or strip as it appears when pulled out to the left to its fullest extent preparatory to being stowed in the tape case.
Fig. 4 is an enlarged fragmentary sectional view showing the eyelet as it appears when about to fasten itself to the tape case upon complete stowing of the flexible extension strip.
Fig. 6 is a partial face view of that part of the peripheral rim of the tape case shown in Fig. 3 containing the openings through which the extension strip is projected for use in the manner shown in Fig. 1.

The strip 5 is held and supported intermediate its ends by being attached tangentially or substantially so to the case 2. It may, in the broader aspect of the invention be attached rigidly, but for most uses we prefer to attach it slidably, as shown in Figs. 1 and 3, where 13 is an aperture in the rim of case 2, and through this aperture and tape opening 4 the extension strip 5 is slidably inserted, as in a guideway.

Regardless of the position to which the strip 5 happens to have been slid in its guideway, it will give accurate inside measurements, provided its free end 9 is placed against the abutment 12. However, it is desirable in practice that the end 9 shall project rearwardly beyond the tape case, or at least even with its rearward wall 2a, in order that the case itself shall not interfere with the measuring operation.

Figure 2:
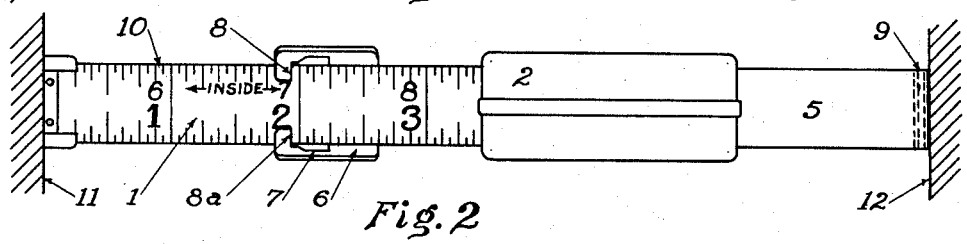
Fig. 2 is a plan view of the parts shown in Fig. 1.

We provide means for preventing the strip 5 from sliding too freely through the apertures 4 and 13. A partition member 14, preferably ring-shaped, is fixed inside the case 2, spaced from the peripheral wall thereof. The strip or extension member 5 is engaged frictionally between the partition member 14 and the margins of the apertures 4 and 13 in the case. Preferably the frame member 6 is arranged to bear frictionally against the tape 1 so as to keep the tape from becoming accidentally displaced during the taking of inside measurements. For that purpose the frame 6 is mounted with a suitable tilt on the end of the resilient strip 5, so that the tape goes through the opening 7 of the frame at an angle, as shown in Figs. 1 and 2, and is caused to frictionally press the members 8, 8a against the face of the tape with a slight brake effect.

When taking an inside measurement, or a measurement between two abutments as 11, 12 the free or zero end of the tape is placed against, say, abutment 11, and the free end 9 of extension member 5 is brought against abutment 12. The correct distance between 11 and 12 is then indicated by indicator 8 on scale 10, regardless of where the tape case 2 may happen to be located in the length of strip 5. In other words, the effective length of strip 5, being greater than the diameter of the tape case 2, projects beyond the case in opposite directions, to points 8 and 9 respectively, as shown in Fig. 2 and consequently the accuracy of the measurements is not at all dependent upon the location of the case 2 along the length of the strip 5. After the measurement has thus been gaged the device can be taken away from between the abutments 11 and 12 and used in the manner of a stick that has been cut to the length 11, 12 when it is desired to transfer the measurement to another piece of work without going to the trouble of actually reading the figure at 8. This capacity of being handled without risk of disarrangement is made possible by the frictional engagement of the strip 5 with the case 2, together with the frictional engagement of strip 5 and member 14, and the engagement of frame member 6 against tape 1.

To provide for stowing the strip 5 inside the case 2 when the device is not being used for taking inside measurements, the partition 14, in addition to frictioning the strip 5 as above described, is arranged to present an annular channel 15. In this channel the strip 5 is stowed by first drawing it forward, that is, to the left in Fig. 1, until its rearward free end 9 enters the opening 13 in the rim of the tape case. The end 9 is then sprung into the channel 15 and the strip is pushed rearwardly as indicated by the dotted lines, Fig. 3, until it is completely stowed in the channel 15. End 9 has an outward projection 9a.

When member 5 has been stowed in the manner described, the frame 6 becomes the eyelet for the tape opening 4 of the case. The tape measure then has the outward appearance of an ordinary tape measure that has not been equipped with our invention.

The mode of mounting the frame 6 on the strip 5, and the shape of the frame itself enable it to automatically clasp itself to the case and to become an eyelet for the tape opening and also to automatically release its frictional grasp on the tape 1. When the member 5 is stowed, the tape 1 is as free to be run in and out, in the ordinary uses of the tape measure, as it would have been if our device were not present.

Figure 5:
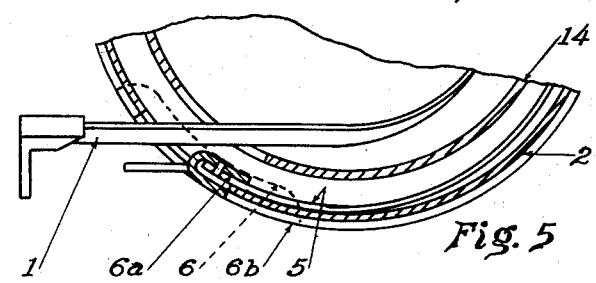
Fig. 5 is a similar view, showing the eyelet in place, the extension member being completely stowed.

As is shown in the enlarged detail views, Figs. 4 and 5, the frame 6 is secured by its flange 6a to the end of resilient strip 5 so that its rear end 6b normally tends to bear upon the rim of the case 2. But when the strip 5 is fully stowed, its spring action causes frame 6 to snap into place and to seat itself snugly around the tape opening 4 and to simultaneously release its grasp on the tape 1.

After the strip 5 has been stowed in the manner described the tape becomes an ordinary tape measure, and there is almost no outward indication of the presence of our extension device that converts it at will into a tape measure for taking accurate inside measurements, or for measuring the distance between any two abutments that are spaced apart.

Having thus described our invention, what we claim and desire to secure by Letters Patent is:

1. In combination with a tape measure comprising a tape and a case having means for coiling the tape, a strip of material of predetermined length and normally stiff, means for keeping an end of said strip adjacent said tape so as to present a measurement indicator upon the tape when the tape is extended, means associated with the case adapted to support said strip intermediate its ends, the said tape bearing a graduated scale arranged to show at the said indicating end of the strip the correct distance between the zero or free end of the tape and the free end of the strip.

2. In combination with a tape measure comprising a tape and a case having means for coiling the tape, a strip of material of predetermined length, normally stiff yet capable of being easily flexed, means for keeping an end of said strip adjacent to said tape when the latter is extended and in slidable relation thereto so as to present a measurement indicator upon the tape, means associated with the case adapted to slidably support said strip intermediate its ends, the said tape bearing a graduated scale that is arranged to show at the said indicating end of the strip the correct distance between the zero or free end of the tape and the rearwardly extended free end of the strip.

3. A tape measure having a casing, a strip-holding device on said casing and an extension strip of predetermined length, greater than the diameter of the case and projecting beyond the same in opposite directions, said strip being slidingly engaged by said holding device and held thereby in substantial alinement with and overlying said tape to present an index thereon when the tape is extended for taking measurements.

4. A structure as set forth in claim 3 wherein the holding device engages the extension member at a place intermediate the ends of said member, one of said ends projecting from the place of attachment at least even with the rear wall of the tape case.

5. In combination with a tape measure including a case, an extension member of predetermined length, said member being slidingly secured substantially tangentially to a peripheral wall of the tape measure case and disposed substantially in alinement with the tape when extended, a frame secured to an end of the extension member and formed with an opening to slidingly receive the tape, and edges presented by said frame adapted to frictionally grasp the tape whereby the frame is caused to yieldingly grasp and to frictionally engage the tape automatically when the said extension member is in its extended position.

6. A structure as set forth in claim 5 wherein the extension member is made of flexible material and the frame is fixed to an end thereof, the arrangement being such that the resilience of the extension member when in position for use constitutes the means whereby the frame is caused to tilt and thereby frictionally grasp the tape, and when in stowed position constitutes a means whereby the frame is caused to automatically release such grasp.

7. A structure as set forth in claim 5 wherein the extension member is made of flexible spring material and the frame is shaped to present an eyelet for said case and is fixed to an end of the extension member in tilted position, the arrangement being such that when the extension member is completely stowed in the tape measure case, the resilience of said member acts to hold the frame to the case at the tape opening thereof, thereby enabling the frame to serve as an eyelet for the tape during the ordinary uses of the tape measure.

8. A tape measure including a casing having the peripheral wall of the casing provided with a tape opening and an aperture adjacent thereto presenting a guideway, and an extension member slidable lengthwise in said guideway and substantially in alinement with the tape when the latter is extended for taking measurements.

9. In combination with a tape measure including a casing, an extension strip of predetermined length mounted for lengthwise movement on said casing, an indicating element on said extension strip, means for holding said indicating element adjacent the graduated scale of the tape when the tape is extended, and means keeping the extension strip in variously adjusted positions on a wall of the case of said tape measure.

10. An extension member for tape measures including a casing and means slidingly securing said extension member on said casing, said member comprising a strip of material of predetermined length, a tilted frame secured to an end of said strip for holding said end adjacent the tape during the winding and unwinding of the tape and indicating means on said holding means for pointing out graduations on said tape.

11. An extension member for tape measures including a casing and means slidingly securing said extension member on said casing, said member comprising a strip of material of predetermined length, a frame member angularly secured to an end of said strip and arranged to frictionally engage the tape when the latter is in extended position and thereby constrain it against accidental displacement during the taking of inside measurements, and indicating means on said frame member for pointing out graduations on the scale of said tape.

12. In combination, a tape measure including a case, an extension member of predetermined length, means for slidably holding the said extension member intermediate its ends on the case of the tape measure and substantially in alinement with the tape when extended, said extension member being made of resilient material and adapted to be flexed when not in use and stowed in circular form around the peripheral wall of the case.

13. A tape measure including a case and having, in combination, an extension strip made of resilient material and of predetermined length, means for supporting said strip when in working position, substantially in alinement with the tape when the latter is extended, said extension strip being adapted to be flexed so as to conform with the shape of the case for stowing therein, and alined apertures in the peripheral wall of the case to slidably receive said strip.

14. A tape measure including a case and having, in combination, a partition member within the case and spaced from the peripheral wall thereof, said peripheral wall of the case being formed with two apertures located substantially in alinement with the direction of the tape when extended, an extension strip of predetermined length and made of resilient material, slidably received in said apertures, and adapted, when flexed, to be stowed in the annular space presented between said partition member and the peripheral wall of the case, said partition member and apertures constituting means for supporting said strip when in working position, substantially in alinement with the tape when the latter is extended.

15. A structure as set forth in claim 14 wherein the partition member and the margins of said apertures in the peripheral wall of the case are relatively alined so as to co-operatively engage the extension strip and impose on it an appropriate frictional resistance against its lengthwise sliding movement.

16. A tape measure including a case and having the peripheral wall of said case formed with two apertures located substantially in alinement with the direction of the tape when extended, an extension member of predetermined length and made of resilient material slidably received in said apertures and adapted, when flexed, to be stowed inside the peripheral wall of the case, an end of said extension member formed with an outward projection to engage an edge of one of said apertures, the aperture adjacent said projection being shaped to present a finger opening to facilitate stowing the extension member.

FRED BUCK.
EUGENE J. WITCHGER.